UNITED STATES PATENT OFFICE.

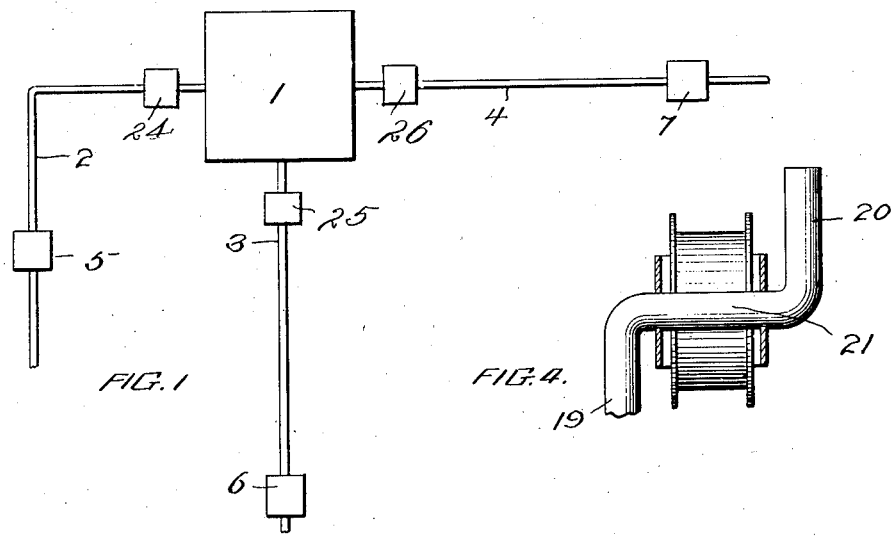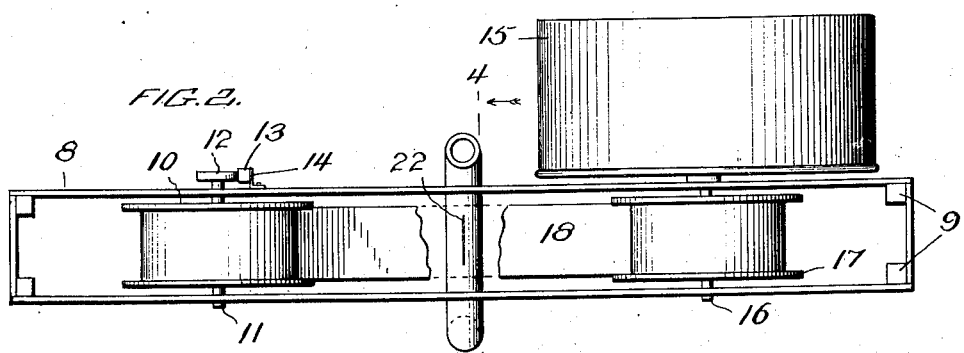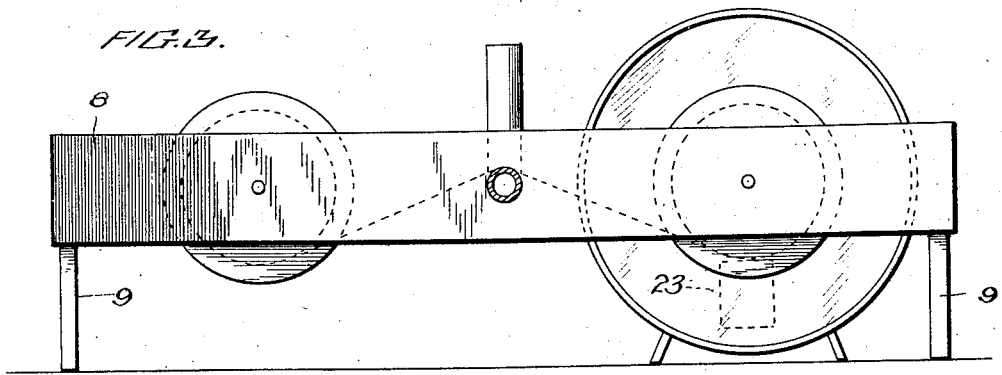

DONALD McDONALD, OF LOUISVILLE, KENTUCKY.

METHOD OF INDICATING THE FLOW AND LEAKAGE OF GAS.

1,090,737.  Specification of Letters Patent.  Patented Mar. 17, 1914.

Application filed April 20, 1912. Serial No. 692,072.

*To all whom it may concern:*

Be it known that I, DONALD MCDONALD, a citizen of the United States, residing at Louisville, in the county of Jefferson and State of Kentucky, have invented certain new and useful Improvements in Methods of Indicating the Flow and Leakage of Gas, of which the following is a specification.

The object of my invention is to provide means whereby the flow of gas through pipes may be ascertained and at the same time detect the amount of leakage from any pipe in a system to enable a gas company to ascertain what part of its service system is subject to excessive leakage.

My invention consists broadly in introducing a medium in the gas, preferably at the gas works, which will flow with the gas and make an indication at predetermined points.

My invention consists further of means coöperating with said medium for registering the time of said indications.

In the drawing, Figure 1 is a diagrammatic view of a gas system; Fig. 2 is a top plan view of mechanism embodying my invention; Fig. 3 is a side elevation of the same, and Fig. 4 is an end view of Fig. 2, parts being removed.

1 represents a gas works; 2, 3 and 4, indicates mains or pipes running from said works.

5, 6 and 7 represent the mechanical element of my invention connected with the gas mains.

8 is a suitable frame which may be supported by legs 9 in a suitable pit along the line of gas mains.

10 is a spring drum mounted upon a shaft 11 in the frame, said drum being provided preferably with a friction disk 12, upon which bears a friction shoe 13, said friction shoe being mounted upon a spring support 14.

15 indicates a suitable clockwork.

16 is a shaft connected with the minute hand of the clock, upon which is mounted a drum 17.

18 is a strip of paper, one end of which is secured to the drum 10 while its other end is secured to the drum 17.

19 is a pipe suitably connected with a gas main having an upwardly extending leg 20 which passes to atmosphere. The pipe is bent between its ends to form a horizontal portion 21 having an extremely narrow slit 22 extending entirely through the wall of the pipe, which slit is closed by reason of the fact that the recording strip 18 bears snugly on the top of the portion 21, as illustrated in Fig. 3. I have found that the slit, if made 1/30 of an inch wide gives satisfaction. However, the width of the slit may be varied without departing from my invention.

23 is a suitable time recording device, preferably operated by the clock 15. The location of this time recording device may be varied.

The reason for making the drum 10 a spring drum is that it relieves the clockwork of drag on the indicating strip 18, thus eliminating danger of stopping the clock.

With the device constructed substantially as I have illustrated and the pipe 19 connected to the gas main, a small amount of gas is allowed to flow continuously through the pipe 19.

In order to ascertain the rate at which gas is flowing through a pipe, two, three or more of my devices (placed at a known distance apart, say 1,000 feet on different mains from the gas works) are connected to the pipes and gas allowed to flow through these connections at the same rate. Sulfureted hydrogen is then injected into the pipe at a point up-stream from the first recorder. The time at which the gas passes each recorder will be registered and the velocity of the gas in the pipe will thus be ascertained. The diameter of the pipe being known, the amount of gas per hour flowing through it is easily obtained.

The strip 18 is coated or impregnated with acetate of lead, inasmuch as sulfureted hydrogen mixed with gas will blacken a paper which is impregnated or coated with acetate of lead. Other chemicals can be used instead of lead and sulfureted hydrogen, but for the purpose of this application, I will refer to these two.

The printing mechanism 23 may be of any of the well-known constructions. Therefore, I will not describe the same in detail.

The operation of my invention is as follows. In order to use my invention for locating leakage in a system of mains, I propose to place a number of the recorders involving my invention at different points throughout the gas system, selecting the points in such a way that the amount of gas flowing to each division of the city mains can be ascertained. When this is done, the time of minimum consumption of gas is selected and a small quantity of sulfureted hydrogen injected into the gas at the works. In this connection, I wish to state that I have found that about one cubic foot of sulfureted hydrogen is sufficient. A small amount of gas, as stated, is allowed to flow continuously through the pipe 19 to atmosphere. As long as the gas is free from sulfureted hydrogen, no mark will be made upon the recording or indicating strip 18. However, as soon as the sulfureted hydrogen passes through the pipe 19, some of it will escape through the slit 22 and come in contact with the indicating strip 18, making a black mark on that part of the strip 18 which is immediately above the slit 22 and the instant of time at which this occurs can be ascertained by the time indication printed on the strip of paper 18.

Inasmuch as the time of the contact of the sulfureted hydrogen with the lead paper will be indicated at each indicator, the velocity of the gas in the several pipes will thus be ascertained, and when the strips 18 from the several selected points of indication are compared, it will be found that some of the sulfureted hydrogen passed the first branch in the mains at a certain instant and that on one of these branches it reached the recorder in ten (10) minutes and on the other in forty (40) minutes. If the diameter of the branches is the same, it will become evident that four times as much gas is flowing to one of these branches as is flowing to the other. In the same way, the flow in all the various branches of the pipe can be observed until the amount of gas leaving the works at the hour of minimum consumption can be accurately traced to the parts of the city in which it disappears. The location of the lines in which the greatest leakage is can in this way be ascertained; and when this is done, the exact leakage in any line can be ascertained without cutting the line, by shutting off all consumption and placing two recorders in the method previously described, to measure the amount of gas passing through the main at the time when all consumption is cut off, no other source of output remaining except leakage.

I have shown indicators 24, 25 and 26 interposed in the mains between the gas plant and the indicators 5, 6 and 7. Now these indicators 24, 25 and 26, will show the total amount of gas passing these points, while the indicators 5, 6 and 7 will register the time the flow reached them, thus the leakage and consumption can be calculated exactly.

I claim:—

1. The method of ascertaining the flow and leakage of gas, consisting in modifying the gas by developing an inherent characteristic therein capable of manifesting itself at a given point and permitting some of the gas to escape at said point and impinge against a recording medium having a characteristic amenable to said inherent characteristic of the gas.

2. The method of ascertaining the flow and leakage of gas in a gas distributing system, which consists in modifying the gas by introducing therein at a central point a modifying medium developing an inherent characteristic therein capable of manifesting itself, passing the modified gas through the system, introducing recording devices in the system at predetermined distance from the central point which have an inherent characteristic amenable to the inherent characteristic of the modified gas and permitting some of the gas to come in contact with the recording devices and manifesting itself.

3. The method of ascertaining the flow and leakage of gas consisting in adding sulfureted hydrogen to the gas and permitting the modified gas to come into contact with a recording device on which it manifests itself.

4. The method of ascertaining the flow and leakage of gas, which consists in introducing sulfureted hydrogen into the gas and permitting the modified gas to impinge against a recording medium treated with acetate of lead.

The foregoing specification signed at Louisville, Ky., this 11th day of December, 1911.

DONALD McDONALD.

In presence of two witnesses:
O. L. FISCHER,
THOS. W. KENNEDY.